US009258950B2

(12) United States Patent
Kidachi

(10) Patent No.: US 9,258,950 B2
(45) Date of Patent: Feb. 16, 2016

(54) DRIP-IRRIGATING DRIPPER AND DRIP IRRIGATION DEVICE

(71) Applicant: Enplas Corporation, Saitama (JP)

(72) Inventor: Masahiro Kidachi, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 14/425,666

(22) PCT Filed: Sep. 5, 2013

(86) PCT No.: PCT/JP2013/005283
§ 371 (c)(1),
(2) Date: Mar. 4, 2015

(87) PCT Pub. No.: WO2014/038208
PCT Pub. Date: Mar. 13, 2014

(65) Prior Publication Data
US 2015/0250111 A1 Sep. 10, 2015

(30) Foreign Application Priority Data

Sep. 6, 2012 (JP) ................................. 2012-196149
Sep. 28, 2012 (JP) ................................. 2012-216574

(51) Int. Cl.
*B05B 15/00* (2006.01)
*A01G 25/02* (2006.01)
*B05B 1/30* (2006.01)
*B05B 15/06* (2006.01)
*B05B 1/02* (2006.01)
*B05B 1/14* (2006.01)

(52) U.S. Cl.
CPC ................ *A01G 25/023* (2013.01); *B05B 1/02* (2013.01); *B05B 1/14* (2013.01); *B05B 1/3006* (2013.01); *B05B 15/00* (2013.01); *B05B 15/069* (2013.01)

(58) Field of Classification Search
CPC .... A01G 25/023; B05B 15/069; B05B 15/00; B05B 1/3006; B05B 1/02; B05B 1/14
USPC .................................. 239/542, 547, 570, 571
See application file for complete search history.

(56) References Cited

U.S. PATENT DOCUMENTS

| 4,161,291 A | * | 7/1979 | Bentley | ................ A01G 25/023 239/542 |
| 5,294,058 A | * | 3/1994 | Einav | ........................ F15C 3/04 239/542 |

(Continued)

FOREIGN PATENT DOCUMENTS

JP 2008-503232 A 2/2008

OTHER PUBLICATIONS

International Search Report for PCT/JP2013/004949 mailed Dec. 17, 2013.

*Primary Examiner* — Steven J Ganey
(74) *Attorney, Agent, or Firm* — Brundidge & Stanger, P.C.

(57) ABSTRACT

A dripper obtained by incorporating together a first member and second member, which are both resin moldings. The first member is on the side into which an irrigating solution flows, and the second member is on the side from which the irrigating solution is discharged. The dripper has an inflow part having a low-pressure stop filter function, and/or a diaphragm part for narrowing a flow path by elevating the hydraulic pressure of the irrigating solution. The dripper makes it possible to stabilize the amount of irrigating solution discharged, irrespective of the hydraulic pressure of the irrigating solution, and also makes it possible to reduce costs.

16 Claims, 19 Drawing Sheets

(56) References Cited

U.S. PATENT DOCUMENTS

| | | |
|---|---|---|
| 5,413,282 A | 5/1995 | Boswell |
| 5,820,028 A * | 10/1998 | Dinur ............... B05B 1/083 239/571 |
| 5,820,029 A | 10/1998 | Marans |
| 7,152,816 B1 * | 12/2006 | Lawyer ............ B05B 1/3006 239/542 |
| 2005/0279866 A1 | 12/2005 | Belford |

* cited by examiner

DRIP-IRRIGATING DRIPPER AND DRIP IRRIGATION DEVICE

TECHNICAL FIELD

The present invention relates to a drip irrigation dripper (hereinafter may simply referred to as a "dripper") and a drip irrigation apparatus including the dripper, and particularly to a dripper and a drip irrigation apparatus including the dripper which are suitable for growing plants.

BACKGROUND ART

Conventionally, as means of supplying irrigation liquids such as water or liquid fertilizer to the plants to be grown on the soil in the agricultural land, the plantation or the like, drip irrigation apparatuses that regulate the supply speed of the irrigation liquid have been employed. The use of the drip irrigation apparatus enables the saving of the irrigation liquid and the management of the growth of the plants.

Such a drip irrigation apparatus includes a dripper for controlling the ejection amount of the irrigation liquid per unit time when ejecting the irrigation liquid having flowed into a flow tube from the water source side (pump side) toward the plants.

One example of such drip irrigation apparatuses is what is called an on-line dripper. The on-line dripper is used by being inserted into holes bored in a tube wall (side wall) of polyethylene pipe or into the opening of the end portion of a microtube. The on-line dripper is conveniently employed not only in soil culture but also in nutriculture or pot culture when used for greenhouse culture, raising seedling, fruit growing, and the like.

As such an on-line dripper, a dripper with what is called a differential pressure control mechanism (pressure correction function) being installed is known. The dripper is configured, for example, with a three-component structure in which an elastic film (e.g., silicone rubber film) such as a diaphragm is sandwiched by an inlet side member and an outlet side member (see PTLS 1 and 2, for example).

The dripper utilizes the operation of the diaphragm (film) in accordance with the liquid pressure of the irrigation liquid having flowed from the inlet of the dripper to control the inflow of the irrigation liquid toward a pressure reduction channel on the downstream side of the inlet and to control the amount of the outflow of the irrigation liquid from the outlet of the dripper after pressure reduction by the pressure reduction channel.

More specifically, in the dripper, when the inflow liquid pressure of the irrigation liquid toward the inlet is increased to a certain level, the diaphragm that is disposed to shield the pressure reduction channel is deflected by the inflow liquid pressure toward the outlet. Due to the deformation of the diaphragm, the reduction pressure channel is opened, and thus the irrigation liquid flows into the pressure reduction channel. The irrigation liquid having flowed into the pressure reduction channel moves toward the outlet while the pressure of the irrigation liquid is reduced in the pressure reduction channel to flow out of the dripper from the outlet. When the inflow liquid pressure toward the inlet is further increased, the amount of the deflection of the diaphragm toward the outlet becomes larger. In association with the larger amount of the deflection of the diaphragm, the sectional size of the channel at the outlet is reduced, and thus the outflow of the irrigation liquid is regulated.

CITATION LIST

Patent Literature

PTL 1
U.S. Pat. No. 5,413,282
PTL 2
U.S. Pat. No. 5,820,029

SUMMARY OF INVENTION

Technical Problem

However, the dripper has the following three problems.

First Problem

When an error occurs in assembling the above-mentioned three components for the dripper, the assembly error greatly affects the performance of the dripper. Thus, variation occurs in the operation of the diaphragm (film), causing the ejection amount of the irrigation liquid to be unstable.

Second Problem

In the dripper, the material cost is raised when silicone rubber is used for the diaphragm.

Third Problem

The dripper requires a manufacturing process in which the three components are separately manufactured, and thereafter they are further assembled. Therefore, the manufacturing cost is raised.

In addition, the dripper requires a liquid pressure that is high to a certain degree to open the pressure reduction channel by causing the diaphragm to be elastically deformed. Therefore, when the dripper is used under relatively high liquid pressure with a high pressure pump being employed, the original functions can be performed with no problem. However, when the dripper is used under low liquid pressure, there is a concern that the diaphragm might not be elastically deformed in a proper manner, causing the original functions not to be sufficiently performed.

The present invention has been achieved taking into consideration the above-mentioned problems. A first object of the present invention is to provide a dripper which makes it possible to stabilize the ejection amount of the irrigation liquid and to further achieve cost reduction by reducing the manufacturing cost, number of components and manufacturing processes, and a drip irrigation apparatus including the dripper.

In addition, a second object of the present invention is to provide a dripper which makes it possible to properly perform drip irrigation even when the liquid pressure of irrigation liquid is low, and a drip irrigation apparatus including the dripper.

Solution to Problem

To achieve at least the above-mentioned first object, the present invention provides the following dripper.
[1] A drip irrigation dripper for controlling an ejection amount of irrigation liquid, having flowed from an inflow part, from an ejection port to eject the irrigation liquid, the drip irrigation dripper including:

a first member integrally formed of a resin material and composing one part on the inflow part side of the drip irrigation dripper; and a second member integrally formed of a resin material and composing the other part on the ejection port side of the drip irrigation dripper, the second member being fixed to the first member, wherein the first member includes:

a first plate-like part having a first inner surface to be brought into close contact with the second member and a first outer surface at a side opposite to the first inner surface;

a first protrusion part being protruded from the first outer surface toward a side opposite to the second member and having the inflow part at a tip portion of the first protrusion part;

a first guide channel formed from the inflow part to the first inner surface and guiding the irrigation liquid having flowed from the inflow part toward the first inner surface; and a pressure reduction channel part for forming, between the first inner surface and the second member, a pressure reduction channel connected continuously to a terminal of an inner surface of the first guide channel and allowing the irrigation liquid having been guided by the first guide channel to flow toward the ejection port while reducing a pressure of the irrigation liquid, and the second member includes:

a second plate-like part having a second inner surface to be brought into close contact with the first inner surface and forming the pressure reduction channel together with the pressure reduction channel part and a second outer surface at a side opposite to the second inner surface;

a second guide channel formed from a terminal position of the pressure reduction channel at the second inner surface to the ejection port and for guiding the irrigation liquid of which pressure is reduced by the pressure reduction channel to the ejection port; and a diaphragm part formed at a terminal of the first guide channel so as to form a part of an inner surface of the second guide channel and being to be deformed toward the second guide channel upon receiving a liquid pressure of the irrigation liquid having been guided by the first guide channel to regulate a width of the second guide channel so as to be smaller as the liquid pressure is increased.

[2] The drip irrigation dripper according to [1], wherein the diaphragm part includes:

a dome-shaped center wall part curved so as to be protruded toward the first member;

a peripheral wall part connected to an outer peripheral end of the center wall part to surround the center wall part and being inclined toward the first member as being outward from the center wall part in a radial direction of the center wall part when viewed in a plan view; and wherein a connection part, between the center wall part and the peripheral wall part, is configured to regulate the width of the second guide channel.

[3] The drip irrigation dripper according to [2], wherein an end edge portion on the connection part side of each of the center wall part and the peripheral wall part has a thinner wall thickness than the connection part and portions other than the end edge portion of the center wall part.

[4] The drip irrigation dripper according to any one of [1] to [3], wherein a starting end of the second guide channel is disposed in the vicinity of the diaphragm part.

[5] The drip irrigation dripper according to any one of [1] to [4], wherein the ejection port opens to the second outer surface.

[6] The drip irrigation dripper according to any one of [1] to [4], wherein the ejection port is formed at a tip portion of a second protrusion part protruded from the second outer surface toward a side opposite to the first member.

In addition, to achieve at least the above-mentioned second object, the present invention provides the following drip irrigation dripper.

[7] A drip irrigation dripper for controlling an ejection amount of irrigation liquid, having flowed from an inflow part, from an ejection port to eject the irrigation liquid, the drip irrigation dripper including:

a plate-like body having a first outer surface on the inflow part side of the drip irrigation dripper and a second outer surface on the ejection port side at a side opposite to the first outer surface;

a first protrusion part being protruded from the first outer surface toward a side opposite to the second outer surface and having the inflow part at a tip portion of the first protrusion part;

a first guide channel formed from the inflow part into the plate-like body and guiding the irrigation liquid having flowed from the inflow part into the plate-like body;

a pressure reduction channel formed so as to be connected to a terminal of the first guide channel to allow the irrigation liquid having been guided by the first guide channel to flow toward the ejection port while reducing a pressure of the irrigation liquid; and a second guide channel formed from a position connected to a terminal of the pressure reduction channel inside the plate-like body to the ejection port disposed on the second outer surface side of the drip irrigation dripper and for guiding the irrigation liquid of which pressure is reduced by the pressure reduction channel to the ejection port, wherein the inflow part has hydrophobicity and prevents the irrigation liquid having a liquid pressure less than a predetermined liquid pressure from flowing into the inflow part.

[8] The drip irrigation dripper according to [7], wherein the inflow part includes a substrate part that partially shields a starting end of the first guide channel, the substrate part includes a plurality of inflow ports extending through the substrate part, and at least a surface on a side, of the substrate part, opposite to the first guide channel has hydrophobicity.

[9] The drip irrigation dripper according to [8], wherein an inner peripheral surface of each of the inflow ports also has hydrophobicity.

[10] The drip irrigation dripper according to [8] or [9], wherein the inflow part comprises a hydrophobic material having hydrophobicity.

[11] The drip irrigation dripper according to [8] or [9], wherein the inflow part includes hydrophobic coating having hydrophobicity.

[12] The drip irrigation dripper according to [10] or [11], wherein the inflow part has, on a hydrophobic surface, an irregular shape that reinforces the hydrophobicity.

[13] The drip irrigation dripper according to any one of [7] to [12], further including a diaphragm part formed at the terminal of the first guide channel so as to form a part of an inner surface of the second guide channel and being to be deformed toward the second guide channel upon receiving the liquid pressure of the irrigation liquid having been guided by the first guide channel, the diaphragm part being for regulating a width of the second guide channel so as to be smaller as the liquid pressure is increased.

[14] The drip irrigation dripper according to [13], including:

a first member integrally formed of a resin material and composing one part on the inflow part side of the drip irrigation dripper; and a second member integrally formed of a resin material and composing the other part on the ejection port side of the drip irrigation dripper, the first member being fixed to the second member, wherein the first member includes:

a first plate-like part having a first inner surface to be brought into close contact with the second member and the first outer surface at a side opposite to the first inner surface;

the first protrusion part;

the first guide channel disposed from the inflow part to the first inner surface; and a pressure reduction channel part for forming, between the first inner surface and the second member, the pressure reduction channel connected continuously to a terminal of an inner surface of the first guide channel, and the second member includes:

a second plate-like part having a second inner surface that is to be brought into close contact with the first inner surface and that forms the pressure reduction channel together with the pressure reduction channel part, and the second outer surface at a side opposite to the second inner surface;

the second guide channel disposed from a terminal of the pressure reduction channel part at the second inner surface to the ejection port; and the diaphragm part.

Further, to achieve the above-mentioned first or second object, the present invention provides the following drip irrigation apparatus.

[15] A drip irrigation apparatus including:

the drip irrigation dripper according to any one of [1] to [14]; and a flow tube through which the irrigation liquid flows, wherein when the first protrusion part of the drip irrigation dripper is inserted into a tube wall or an opening of the flow tube, the irrigation liquid in the flows tube to flow into a channel of the drip irrigation dripper from the inflow part.

Advantageous Effects of Invention

With the inventions according to any of [1] to [6], the ejection amount of the irrigation liquid can be stabilized, and in addition cost reduction can be achieved by reducing the manufacturing cost, number of components and manufacturing processes.

In particular, with the invention according to [1], a dripper excellent in controlling the ejection amount, capable of reducing the pressure of the irrigation liquid using the pressure reduction channel and of regulating the width of the second guide channel using the diaphragm part can be manufactured with less assembly error with only two components of the first member and the second member. Therefore, it is possible to stabilize the ejection amount of the irrigation liquid, and to achieve cost reduction by reducing the manufacturing cost, number of components and manufacturing processes.

In addition, with the invention according to [2], the diaphragm part can be formed into a suitable shape to be deformed toward a predetermined portion facing the diaphragm part in the inner surface of the second guide channel upon efficiently receiving the liquid pressure of the irrigation liquid before pressure reduction. Therefore, it is possible to regulate the channel width more properly.

In addition, with the invention according to [3], the rigidity near the connection part to be used for regulating the width of the channel in the diaphragm part is partially weakened, thereby enabling the connection part to be moved more efficiently depending on the liquid pressure. Therefore, it is possible to regulate the channel width more simply and properly.

In addition, with the invention according to [4], the shape of a metal mold for molding the second member from a resin can be simplified, compared with the case where the starting end of the second guide channel is disposed away from the diaphragm part. Therefore, it is possible to further reduce the manufacturing cost.

In addition, with the invention according to [5], the configuration of the second member can be simplified. Therefore, it is possible to further reduce the manufacturing cost.

In addition, with the invention according to [6], it is possible to select a suitable configuration to connect a tube to the ejection port to adjust the ejecting direction.

In addition, with the inventions according to any of [7] to [14], even when the liquid pressure of the irrigation liquid is low, drip irrigation can be performed properly.

In particular, with the invention according to [7], the lower limit of the liquid pressure of the irrigation liquid flowing from the inflow part can be controlled so as to be low due to hydrophobicity of the inflow part. Therefore, even when the liquid pressure of the irrigation liquid is low, the irrigation liquid can be properly used for the drip irrigation.

In addition, with the invention according to [8], a portion, out of the inflow part, to be exposed to the irrigation liquid outside of the dripper has hydrophobicity. Therefore, it is possible to regulate the inflow of the irrigation liquid more properly.

In addition, with the invention according to [9], capillary action in the inflow port can be surely suppressed. Therefore, it is possible to regulate the inflow of the irrigation liquid more properly.

In addition, with the invention according to [10], the hydrophobicity of the inflow part can be achieved with a smaller number of components.

In addition, with the invention according to [11], the hydrophobicity of the inflow part does not depend on the material of the inflow part. Therefore, it is possible to further enhance the freedom in selecting the material of the inflow part.

In addition, with the invention according to [12], the lower limit of the liquid pressure of the irrigation liquid flowing from the inflow part can also be adjusted to be somewhat higher. Therefore, it is possible to further enhance the freedom in selecting the pressure of the inflow liquid during the use of the dripper under low pressure.

In addition, with the invention according to [13], even when the dripper is used under high pressure, the flow rate of the irrigation liquid toward the ejection port can be regulated by the diaphragm part. Therefore, it is possible to control the ejection amount of the irrigation liquid more properly. In addition, the diaphragm part does not shield the pressure reduction channel, so as not to be involved in the regulation of the inflow into the pressure reduction channel. Therefore, with the invention according to [13], the diaphragm part does not constitute a cause for raising the lower limit of the liquid pressure to be used toward the high pressure side (i.e., a cause for hindering the drip irrigation using low-pressure irrigation liquid).

In addition, with the invention according to [14], the dripper excellent in controlling the ejection amount can be manufactured with less assembly error with only two components made of a resin material. Therefore, it is possible to stabilize the ejection amount of the irrigation liquid, and to achieve further cost reduction by reducing the manufacturing cost, number of components and manufacturing processes.

In addition, with the invention according to [15], it is possible to stabilize the ejection amount of the irrigation liquid, having flowed into the inflow part from the flow tube, from the ejection port, and to achieve cost reduction by reducing the manufacturing cost, number of components and manufacturing processes. Alternatively, with the invention according to [15], even when the liquid pressure of the irrigation liquid flowing through the flow tube is low, it is possible to allow this irrigation liquid to flow into the channel of the dripper to use the irrigation liquid for drip irrigation properly.

DESCRIPTION OF EMBODIMENTS

In the following, embodiments of a dripper according to the present invention and a drip irrigation apparatus including the dripper will be described with reference to FIGS. 1 to 19.

Figure 1:
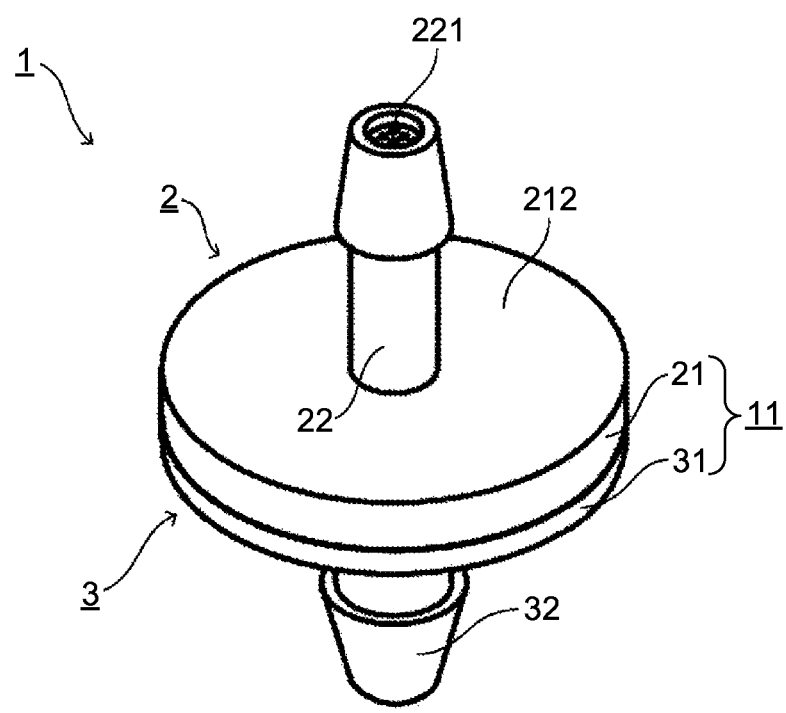
FIG. 1 is a perspective bird's-eye view illustrating a dripper according to an embodiment of the present invention.
Figure 2:
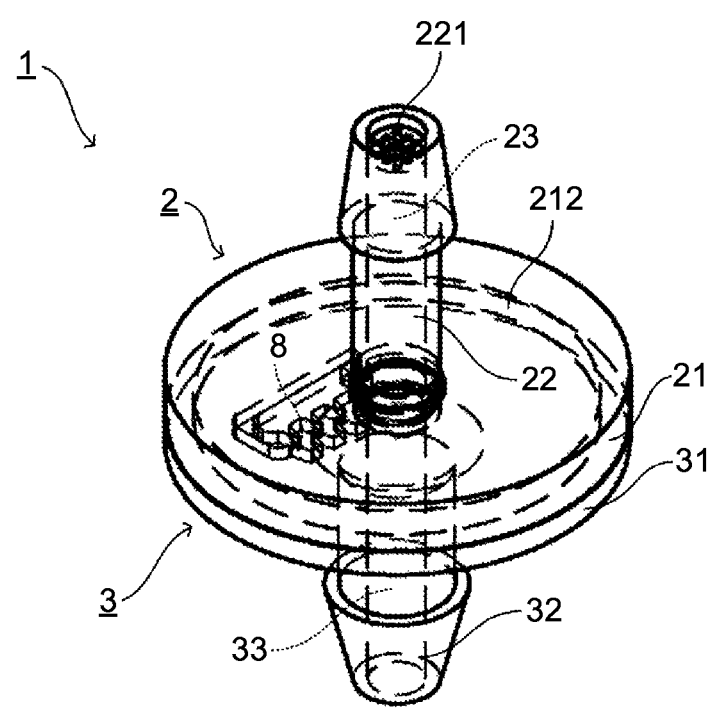
FIG. 2 is a transparent bird's-eye view illustrating the dripper.
Figure 3:
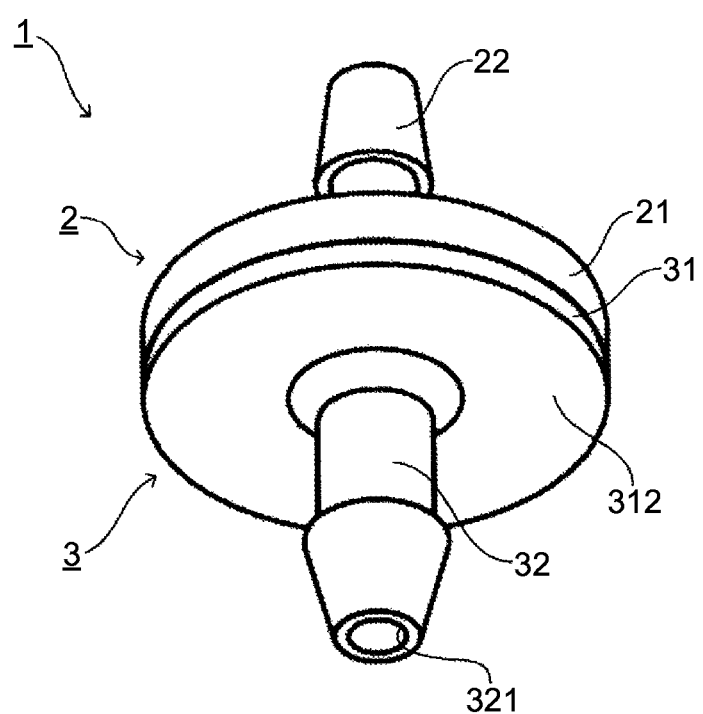
FIG. 3 is a perspective upward view of the dripper.
Figure 4:
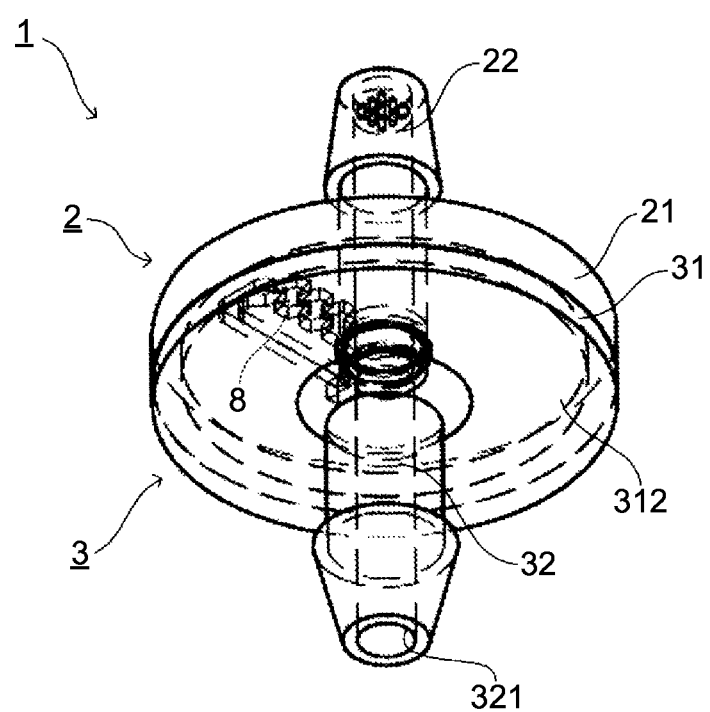
FIG. 4 is a transparent upward view of the dripper.
Figure 5:
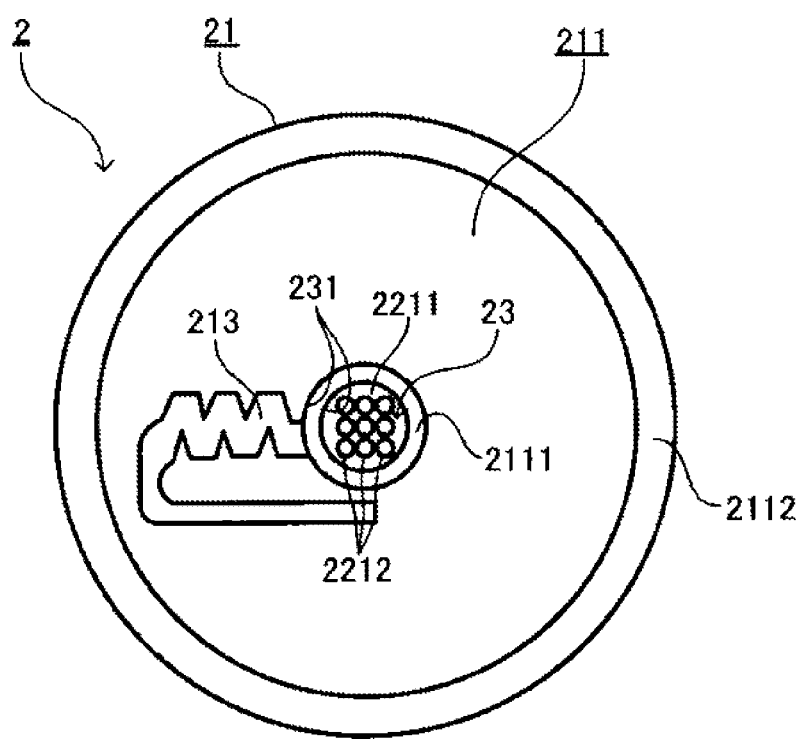
FIG. 5 is a bottom view of a first member in the dripper.
Figure 6:
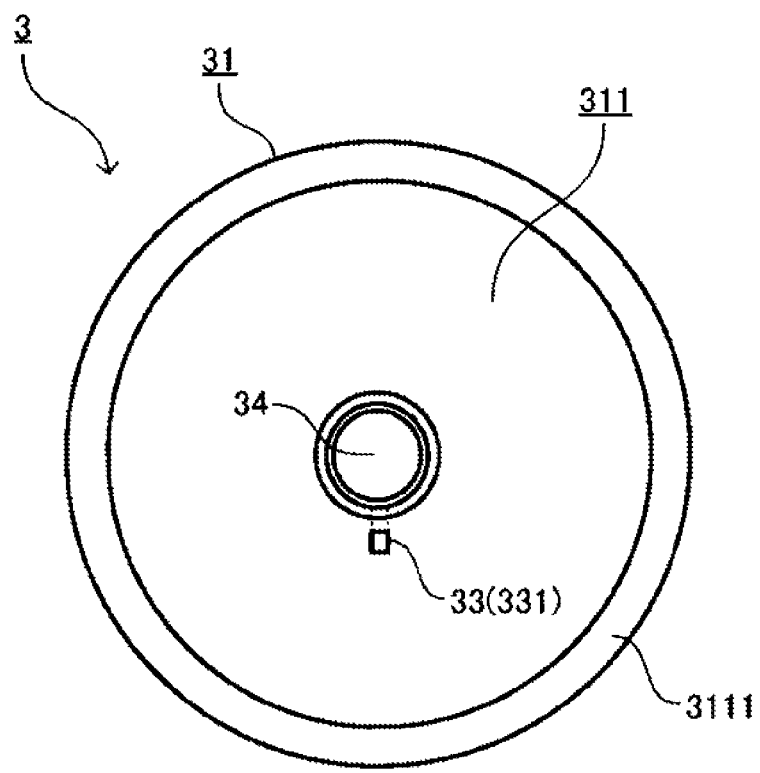
FIG. 6 is a top view of a second member in the dripper.
Figure 7:
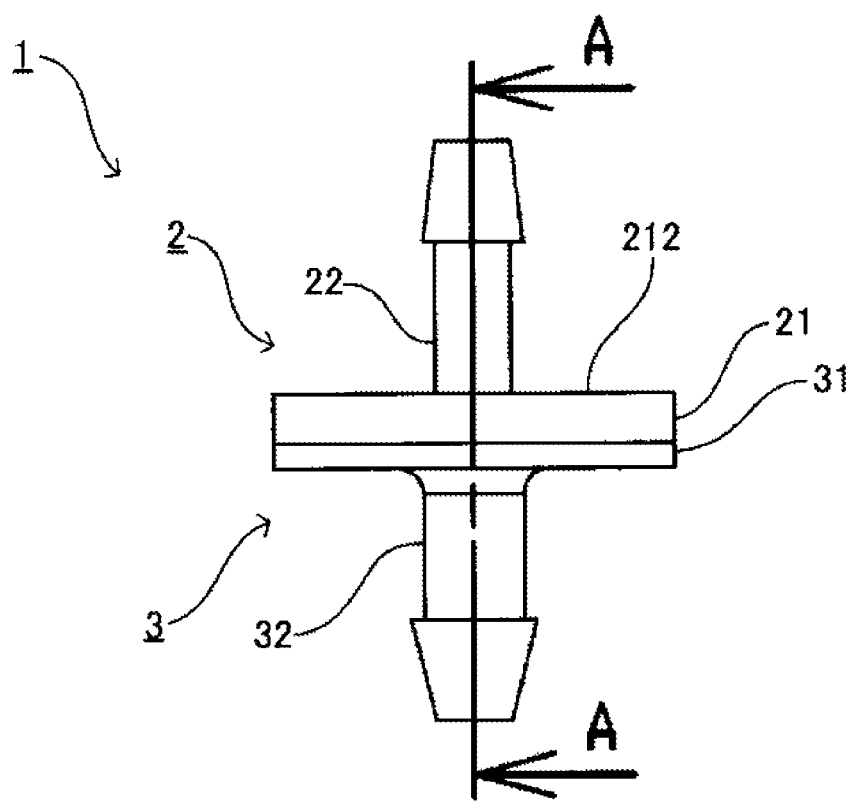
FIG. 7 is a front view of the dripper.
Figure 8:
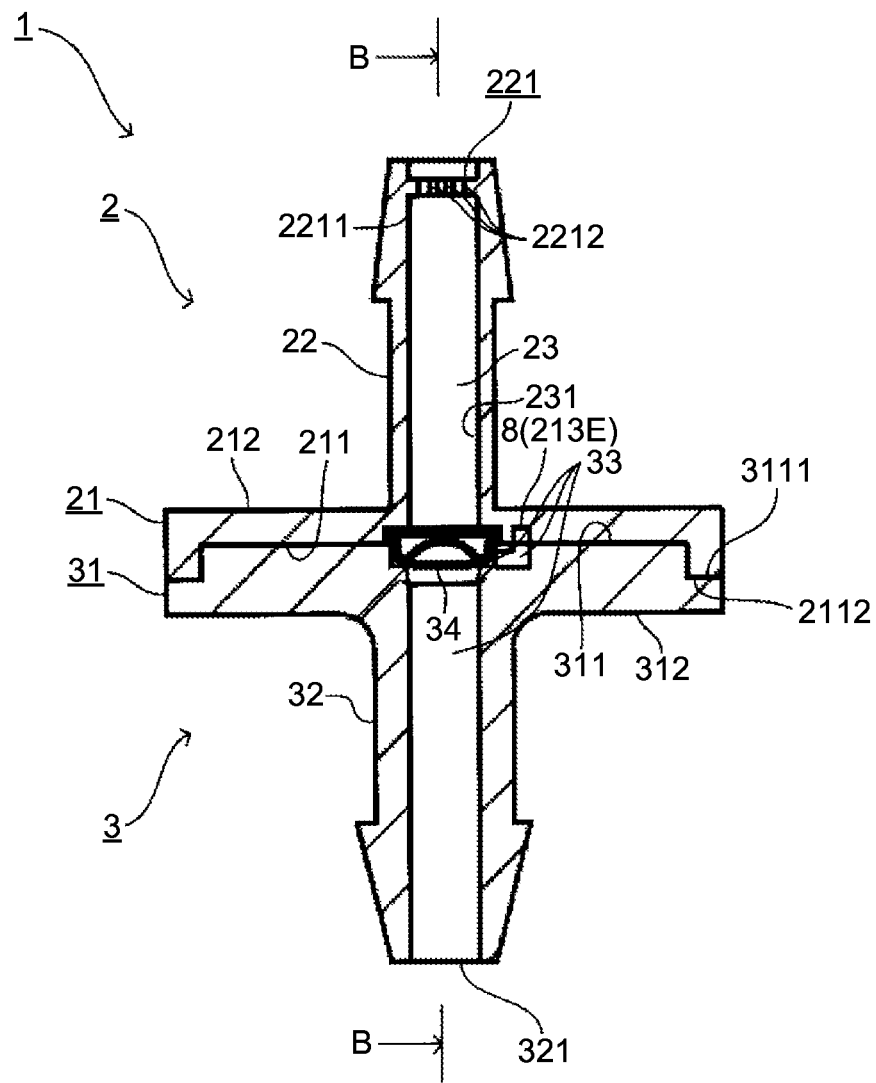
FIG. 8 is a sectional view of the dripper taken along line A-A in FIG. 7.
Figure 9:
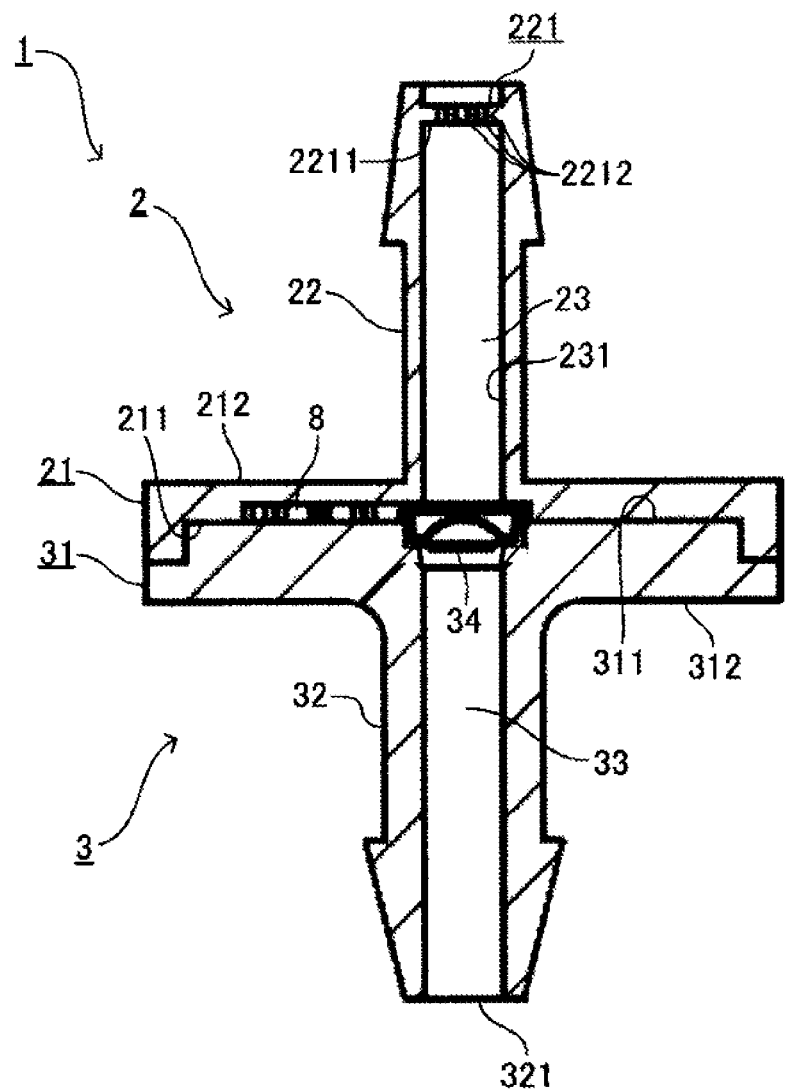
FIG. 9 is a sectional view of the dripper taken along line B-B in FIG. 8.
Figure 10:
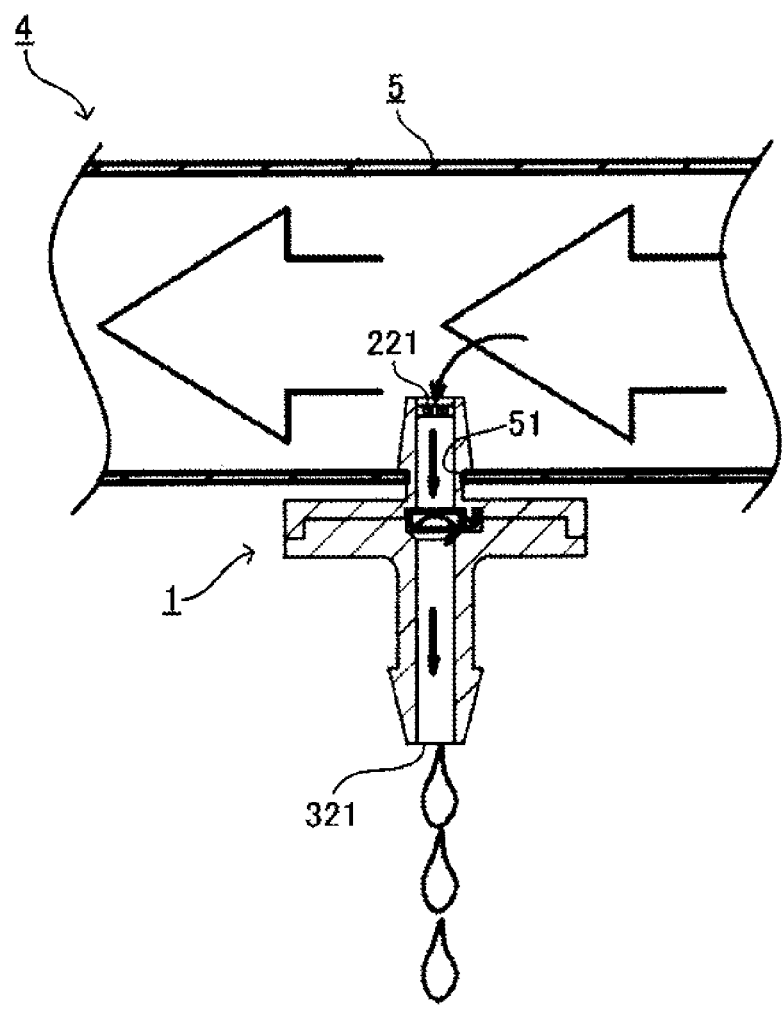
FIG. 10 is a sectional view schematically illustrating a drip irrigation apparatus according to an embodiment of the present invention.

FIG. 1 is a perspective bird's-eye view illustrating dripper 1 in the present embodiment. FIG. 2 is a transparent birds-eye view illustrating dripper 1. FIG. 3 is a perspective upward view of dripper 1. FIG. 4 is a transparent upward view of dripper 1. FIG. 5 is a bottom view of first member 2 to be described later in dripper 1. FIG. 6 is a top view of second member 3 to be described later in dripper 1. FIG. 7 is a front view of dripper 1. FIG. 8 is a sectional view of dripper 1 taken along line A-A in FIG. 7. FIG. 9 is a sectional view of dripper 1 taken along line B-B in FIG. 8. FIG. 10 is a schematic sectional view illustrating drip irrigation apparatus 4 in the present embodiment.

As illustrated in FIG. 10, drip irrigation apparatus 4 is composed of elongated tube 5 as a flow tube in which the irrigation liquid flows, and dripper 1 inserted into tube 5 through through-hole 51 bored in the side wall of tube 5.

It is noted that, while not illustrated, dripper 1 may be used by being inserted into the opening of an end portion of the tube.

Dripper 1, being inserted into tube 5 in this manner, controls the ejection amount of the irrigation liquid per unit time when the irrigation liquid in tube 5 is ejected to the outside.

It is noted that, while one dripper 1 and one through-hole 51 are illustrated for convenience in FIG. 10, actually a plurality of drippers 1 and through-holes 51 are often disposed along the longitudinal direction of tube 5 at a predetermined interval.

In addition, in FIG. 10, the right and left sides of the channel in tube 5 correspond to the upstream side and the downstream side, respectively.

Dripper 1 will be described further in detail. As illustrated in FIGS. 1 to 10, dripper 1 is formed by fixing first member 2 and second member 3 to each other. Each of first member 2 and second member 3 is integrally formed of a resin material. The method of fixing first member 2 and second member 3 may be joining by means of adhesion using an adhesive, welding, or the like, or alternatively may be pressure joining by means of pressing. In addition, first member 2 and second member 3 may be formed of the same resin material, or alternatively may be formed of different resin materials. Further, as the resin material, an inexpensive resin material such as polypropylene may be employed. Furthermore, each of first member 2 and second member 3 may be integrally molded by injection molding.

[Specific Configuration of First Member]
<First Plate-Like Part>

As illustrated in FIGS. 1 to 5 and FIGS. 7 to 10, first member 2 has disc-shaped first plate-like part 21. The shape of first plate-like part 21 is circular in a plan view. However, the shape of the first plate-like part in the present invention does not need to be limited to a disc shape; for example, rectangular or other polygonal plate shapes may be employed.

First plate-like part 21 has first inner surface (bottom surface in FIGS. 8 and 9) 211 to be brought into close contact with second member 3, and first outer surface (top surface in FIGS. 8 and 9) 212 at the side opposite to first inner surface 211.

First inner surface 211 and first outer surface 212 are formed so as to be planes disposed parallel to each other across the thickness of first plate-like part 21.

As illustrated in FIG. 5, annular belt-shaped recess 2111 is formed at the center of first inner surface 211. As illustrated in FIG. 8, rim part 2112 of first inner surface 211 is protruded toward second member 3. First plate-like part 21 composes plate-like body 11 (see FIGS. 1 and 8) together with second plate-like part 31 to be described later.

<First Protrusion Part and Inflow Part>

As illustrated in FIGS. 1 to 4 and FIGS. 7 to 10, first member 2 has first protrusion part 22. First protrusion part 22 is protruded from the center portion of first outer surface 212 of first plate-like part 21 toward the side opposite to second member 3 (upward in FIGS. 7 to 9).

The outer peripheral surface of first protrusion part 22 is formed of a cylindrical surface from the base end portion (lower end portion) to the tip portion (upper end portion) in the protrusion direction of first protrusion part 22, and of a frustum surface formed at the tip side of the cylindrical surface. The frustum surface is a tapered surface formed such that the outer diameter of first protrusion part 22 is gradually decreased toward the tip side. The frustum surface is connected to the cylindrical surface through a plane expanding outwardly in the radial direction from that cylindrical surface. The frustum surface functions as a stopper when dripper 1 is inserted into tube 5 (see FIG. 10). However, the outer peripheral surface of the first protrusion part in the present invention does not need to be limited to the cylindrical surface and the frustum surface; a square tube surface, a prismoid surface, or the like may also be employed.

In addition, first protrusion part 22 is formed into a hollow shape (tubular shape) by the presence of first guide channel 23 to be described later.

Figure 11:
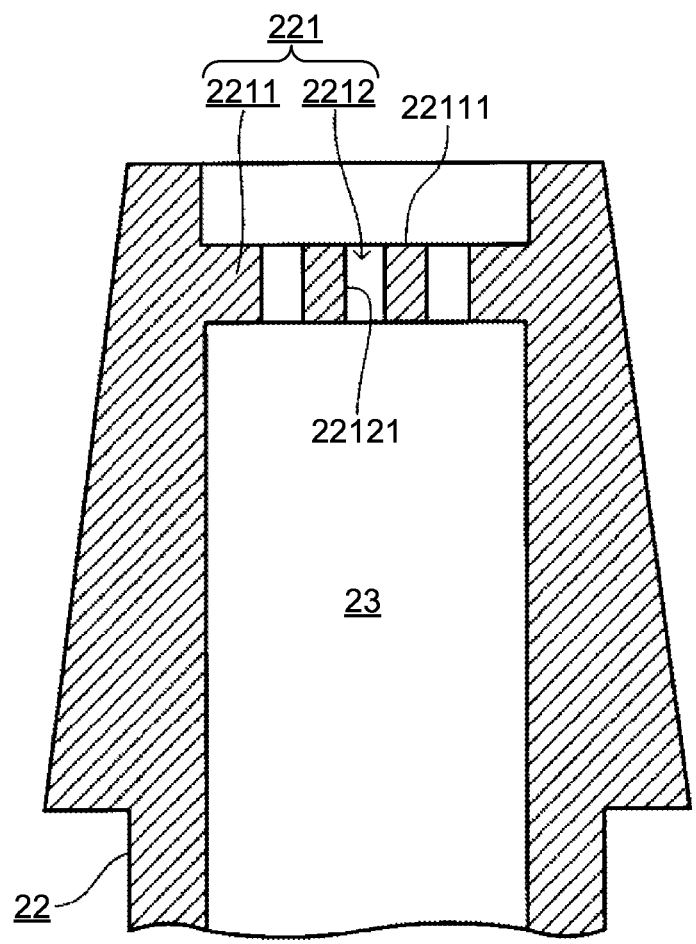
FIG. 11 is an enlarged sectional view of an inflow part in the dripper.

Further, inflow part 221 is formed near the tip portion of first protrusion part 22. FIG. 11 is an enlarged sectional view of inflow part 221.

As illustrated in FIGS. 8, 9 and 11, inflow part 221 has substrate part 2211 orthogonal to the longitudinal direction of first protrusion part 22, and a plurality of inflow ports 2212 extended vertically (in other words, in the longitudinal direction of first protrusion part 22) through substrate part 2211. Inflow port 2212 is a column-shaped pore.

As illustrated in FIG. 11, the starting end portion (upper end portion) of first guide channel 23 is partially shielded from the outer space outside of dripper 1 by substrate part 2211 of inflow part 221, and is partially opened to the outer space through inflow ports 2212 extending through substrate part 2211.

It is noted that, while in FIG. 5 each inflow port 2212 is disposed at an intersection of the rectangular lattice, the disposition of the inflow ports in the present invention does not need to be limited to one as in FIG. 5.

Inflow part 221 is provided with a low-pressure stop filter function for not allowing irrigation liquid having less than a predetermined pressure (e.g., 0.005 MPa) to flow into the channel of dripper 1.

There are several possibilities to be considered for the means to embody the low-pressure stop filter function. For example, when polypropylene is used as a material for dripper 1, the low-pressure stop filter function can be imparted to inflow part 221, since polypropylene itself is a high water-repellent (hydrophobic) material with a low surface energy.

Figure 12:
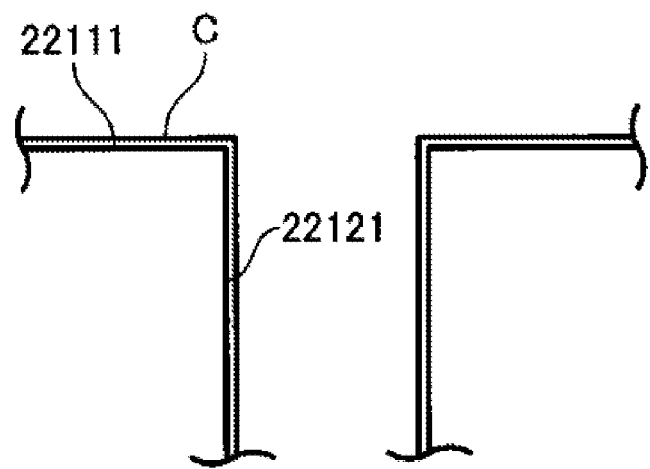
FIG. 12 is an enlarged sectional view illustrating one example of means to embody a low-pressure stop filter function of the inflow part.

Other than that, as illustrated in FIG. 12, for example hydrophobic coating C such as fluorine coating by means of a fluorine coating agent is applied to surface 22111 of substrate part 2211 outside of dripper 1 (in other words, at the side opposite to first guide channel 23 to be described later) and, as needed, to the inner peripheral surface 22121 of inflow port 2212. The hydrophobic coating C reduces the surface energy. In this case, the hydrophobic coating C can impart the low-pressure stop filter function to inflow part 221 locally without depending on the material of dripper 1.

Figure 13:
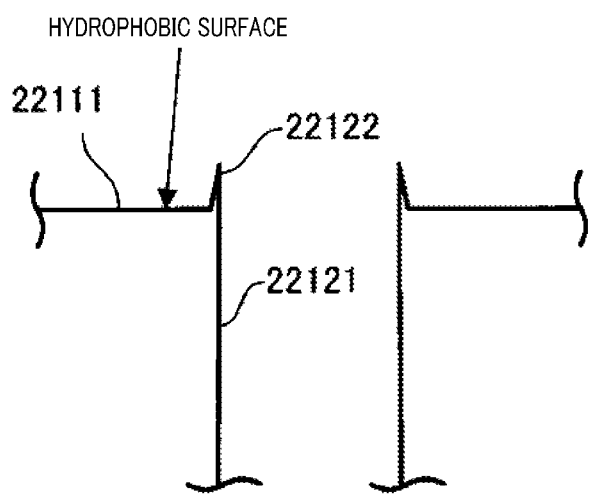
FIG. 13 is an enlarged sectional view illustrating another example of means to embody the low-pressure stop filter function of the inflow part.

In addition, hydrophobicity may be reinforced by, for example, forming an irregular shape on the hydrophobic surface, as needed. The hydrophobic surface may be formed with the above-mentioned material or with the hydrophobic coating. As illustrated in FIG. 13, the irregular shape may be burr 22122 formed at the upper opening edge of inflow port 2212, or may be an irregular shape formed by transferring the irregular shape intentionally formed on the transfer surface of a metal mold.

In addition, it is also possible to optimize the low-pressure stop filter function by adjusting the inner diameter, pitch, number, opening shape and wall thickness of inflow port 2212, the surface roughness of inflow part 221, and the like.

When the liquid pressure of the irrigation liquid in tube 5 is raised to a predetermined pressure (fracture hydraulic pressure), inflow part 221 allows the irrigation liquid to flow into dripper 1 through inflow port 2212. Here, from the viewpoint of allowing dripper 1 in the present embodiment to favorably function when being used under low pressure, it is desirable to select, as the predetermined pressure, a sufficiently low pressure of about 0.005 MPa exemplified earlier. However, the "predetermined pressure" is embodied (set) depending on the degree of hydrophobicity of inflow part 221. Accordingly, when imparting hydrophobicity to inflow part 221, necessary hydrophobicity-causing factors (the above-described material of inflow part 221, type and film thickness of the hydrophobic coating, surface shape of the hydrophobic surface, and the like) may be selected based on experiment results or the like, taking into consideration the relationship between the hydrophobicity and the predetermined pressure that should be set.

Figure 14A:
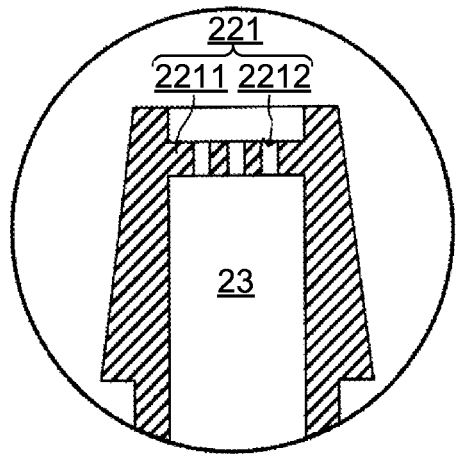
FIG. 14A is an enlarged sectional view of the inflow part before the inflow of irrigation liquid.
Figure 14B:
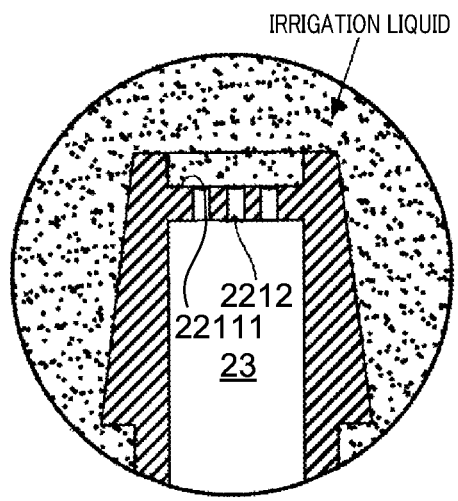
FIG. 14B is an enlarged sectional view of the inflow part when the liquid pressure of irrigation liquid is less than fracture hydraulic pressure.
Figure 14C:
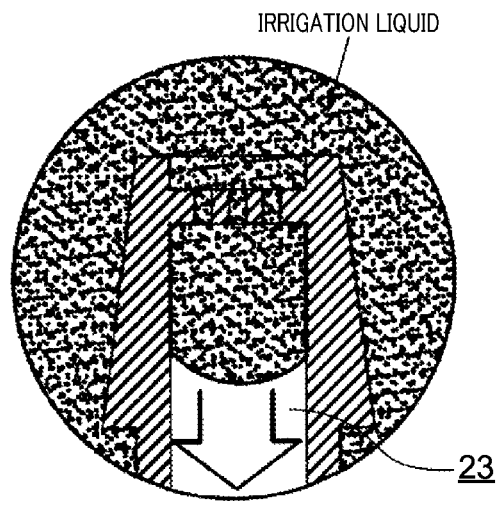
FIG. 14C is an enlarged sectional view of the inflow part into which irrigation liquid having equal to or more than fracture hydraulic pressure flows.

FIGS. 14A, 14B and 14C illustrate specific examples of the operation of inflow part 221.

First, as illustrated in FIG. 14A, when the external liquid pressure to which inflow part 221 is exposed is 0 MPa (in other words, there is no irrigation liquid in tube 5), the inflow regulation of the irrigation liquid by inflow part 221 is not performed as a matter of course.

Next, as illustrated in FIG. 14B, when the external liquid pressure is less than 0.005 MPa (the above-mentioned fracture hydraulic pressure), the low-pressure stop filter function works based on the hydrophobicity of inflow part 221. As a result, the irrigation liquid outside of inflow part 221 (in other words, in tube 5) is dammed at outer surface 22111 of substrate part 2211 and at the upper opening end of inflow port 2212. Therefore, the inflow into first guide channel 23 of dripper 1 is regulated (prevented).

Next, as illustrated in FIG. 14C, when the external liquid pressure is equal to or more than 0.005 MPa, the external liquid pressure surpasses the hydrophobicity of inflow part 221. Therefore, the irrigation liquid outside of inflow part 221 flows into first guide channel 23 of dripper 1 from inflow port 2212.

As has been described above, when the liquid pressure of the irrigation liquid in tube 5 is raised to the predetermined pressure (fracture hydraulic pressure), inflow part 221 allows the irrigation liquid to flow into dripper 1 through inflow port 2212.

<First Guide Channel>

As illustrated in FIGS. 8 and 9, first member 2 has first guide channel 23 as the most upstream channel of dripper 1.

As illustrated in FIGS. 8 and 9, first guide channel 23 is formed from inflow part 221 to first inner surface 211 of first plate-like part 21 (in other words, toward the inside of plate-like body 11). For example, first guide channel 23 is a hole extending through first protrusion part 22 along the longitudinal direction of first protrusion part 22.

First guide channel 23 guides the irrigation liquid having flowed from inflow part 221 toward first inner surface 211 (downward in FIGS. 8 and 9).

It is noted that, while channel inner surface 231 (in other words, inner peripheral surface of first protrusion part 22 defining the shape of first guide channel 23) of first guide channel 23 is formed so as to be a cylindrical surface concentric with the outer peripheral surface of first protrusion part 22, the shape of the channel inner surface in the present invention does not need to be limited to such a shape; for example, a square tube surface, or the like may also be employed.

<Pressure Reduction Channel>

As illustrated in FIG. 5, first member 2 has pressure reduction channel part 213 provided as a recess on first inner surface 211 of first plate-like part 21.

As illustrated in FIG. 5, pressure reduction channel part 213 is composed of groove part 213 connected continuously to the terminal (in other words, downstream end) of channel inner surface 231 of first guide channel 23.

As illustrated in FIG. 5, groove part 213 is formed into a substantially U-shape. That is, groove part 213 is formed in such a shape as to extend outwardly in a serpentine manner in the radial direction of first inner surface 211 from the terminal of channel inner surface 231 of first guide channel 23, and then to turn back before rim part 2112 of first inner surface 211 to return to the vicinity of the terminal of channel inner surface 231 without serpentine. That is, when first inner surface 211 is viewed in a plan view, groove part 213 includes a zig-zag part being extended along the radial direction of first inner surface 211, and a turn-back part including a linear portion and being extended from the tip portion of the zig-zag part to a position overlapping the starting end of second guide channel to be described later.

Pressure reduction channel part 213 forms pressure reduction channel 8 (see FIG. 2) together with second member 3. Pressure reduction channel 8 allows the irrigation liquid having been guided by first guide channel 23 to flow toward ejection port 321 to be described later while reducing the pressure of the irrigation liquid.

It is noted that the shape of the pressure reduction channel part in the present invention does not need to be limited to the shape illustrated in FIG. 5 as long as pressure reduction channel 8 can be connected to the terminal of first guide channel 23. In addition, a plurality of pressure reduction channel parts 213 may be provided.

[Specific Configuration of Second Member]

<Second Plate-Like Part>

On the other hand, as illustrated in FIGS. 1 to 4 and FIGS. 6 to 10, second member 3 has second plate-like part 31. The shape of second plate-like part 31 is a circular disc-shape being concentric with and having the same diameter as that of first plate-like part 21 in a plan view. However, the shape of the second plate-like part in the present invention does not need to be limited to a disc shape; for example, rectangular or other polygonal plate shapes may be employed.

Second plate-like part 31 has second inner surface (top surface in FIGS. 8 and 9) 311 to be brought into close contact with first inner surface 211 in first plate-like part 21, and second outer surface (bottom surface in FIGS. 8 and 9) 312 at the side opposite to second inner surface 311.

Second inner surface 311 and second outer surface 312 are formed so as to be planes disposed parallel to each other across the thickness of second plate-like part 31.

It is noted that second inner surface 311 may be joined to first inner surface 211.

Rim part 3111 of second inner surface 311 is concaved by the same dimension as the protrusion dimension of rim part 2112 of first inner surface 211 (see FIG. 8). It is also possible to use rim parts 3111 and 2112 for positioning first member 2 and second member 3.

<Second Protrusion Part and Ejection Port>

As illustrated in FIGS. 1 to 4 and FIGS. 7 to 10, second member 3 has second protrusion part 32. Second protrusion part 32 is protruded from the center portion of second outer surface 312 of second plate-like part 31 toward the side opposite to first member 2 (downward in FIGS. 7 to 9).

The outer peripheral surface of second protrusion part 32 is formed of a cylindrical surface from the base end portion (upper end portion) of second protrusion part 32 to the tip portion (lower end portion) in the protrusion direction of second protrusion part 32, and of a frustum surface formed at the tip side of that cylindrical surface. The frustum surface is connected to the cylindrical surface through a plane expanding outwardly in the radial direction from that cylindrical surface. However, the outer peripheral surface of the second protrusion part in the present invention does not need to be limited to the cylindrical surface and the frustum surface; a square tube surface, a prismoid surface, or the like may also be employed.

In addition, second protrusion part 32 is formed into a hollow shape (tubular shape) by the presence of second guide channel 33 to be described later.

Further, ejection port 321 formed of a circular opening is formed at the tip portion of second protrusion part 32.

<Second Guide Channel>

Figure 15:
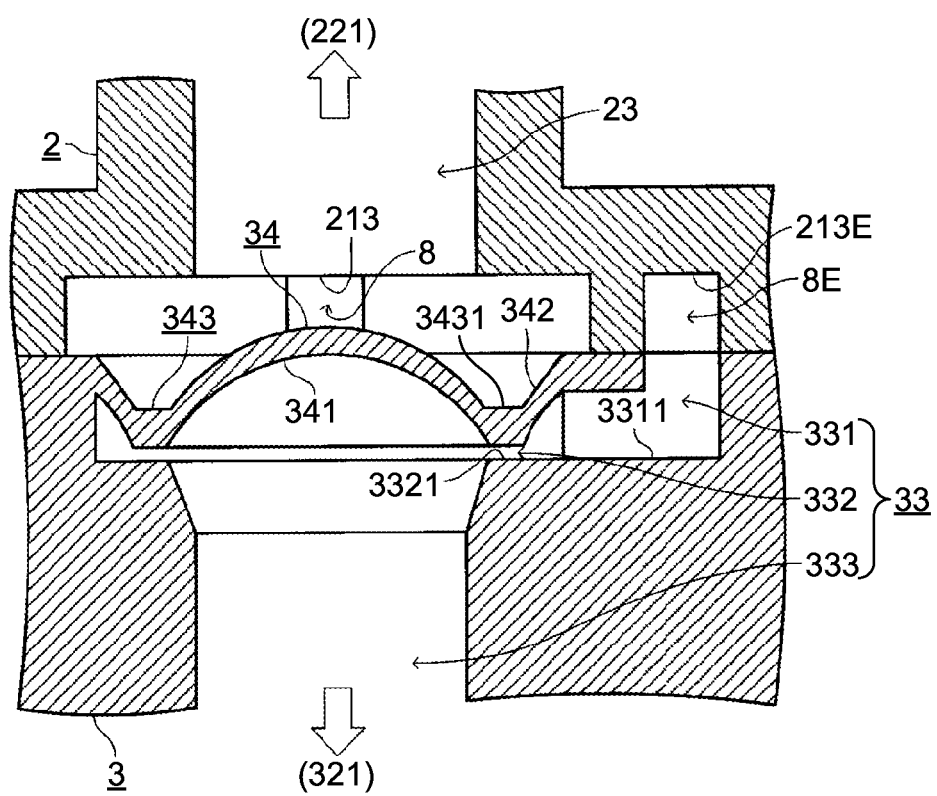
FIG. 15 is an enlarged sectional view of a diaphragm part and its periphery in the dripper.

As illustrated in FIGS. 8, 9 and 15, second member 3 has second guide channel 33.

As illustrated in FIGS. 8 and 15, second guide channel 33 is formed from a position, opposed to terminal (in other words, downstream end) 213E of pressure reduction channel part 213, on second inner surface 311 of second plate-like part 31 (in other words, inside plate-like body 11) to ejection port 321. For example, second guide channel 33 includes a hole extending through second protrusion part 32 along the longitudinal direction of second protrusion part 32.

More specifically, as illustrated in FIG. 15, second guide channel 33 is composed of starting end channel section (first section) 331 as a starting end portion, width-regulated channel section (second channel) 332 connected to the downstream side of first section 331, and ejection guide channel section (third section) 333 connected to the downstream side of second section 332. In first section 331, the channel inner surface is formed into a rectangular shape. In addition, second section 332 is formed of a relatively narrow space surrounded by bottom surface (hereinafter, referred to as inner bottom surface) 3321 in the channel inner surface formed in second plate-like part 31 and of diaphragm part 34 to be described later. It is noted that inner bottom surface 3321 is continuously connected to inner bottom surface 3311 (see FIG. 15) of first section 331 in such a shape as to be in the same plane at the radially inner side. Further, the channel inner surface of third section 333 is formed so as to be a cylindrical surface concentric with first guide channel 23. The third section in the present invention does not need to be limited to such a configuration, and may be formed to have a square tube surface, or the like, for example.

In addition, in second guide channel 33, first section 331 is designed to be opposed to terminal 8E (see FIG. 15) of pressure reduction channel 8 so as to bring first inner surface 211 and second inner surface 311 into close contact with each other, thereby allowing second guide channel 33 to communicate with pressure reduction channel 8.

Second guide channel 33 guides the irrigation liquid after pressure reduction by pressure reduction channel 8 to ejection port 321.

<Diaphragm Part>

Furthermore, as illustrated in FIGS. 8 to 10 and 15, second member 3 has diaphragm part 34 at a position corresponding to the terminal of first guide channel 23 on second inner surface 311 of second plate-like part 31.

Diaphragm part 34 is formed so as to separate first guide channel 23 and second guide channel 33 from each other except communication through pressure reduction channel 8. That is, first guide channel 23 and third section 333 are separated from each other by diaphragm part 34, and communicate with each other through pressure reduction channel 8, first section 331 and second section 332.

Further, diaphragm part 34 forms a part of the channel inner surface of second guide channel 33, and, as described above, forms second section 332 together with inner bottom surface 3321.

Diaphragm part 34 receives the liquid pressure of the irrigation liquid having been guided by first guide channel 23. That irrigation liquid is led to pressure reduction channel 8.

In addition, diaphragm part 34 is deformed toward inner bottom surface 3321 (i.e., a portion facing diaphragm part 34 in the channel inner surface of second guide channel 33) by the liquid pressure of the irrigation liquid. Diaphragm part 34 is deformed such that the width of the channel of second section 332 (i.e., the width of the channel of second guide channel 33 at a position where diaphragm part 34 is deformed) becomes smaller, as that liquid pressure is increased.

More specifically, as illustrated in FIG. 15, diaphragm part 34 has dome-shaped center wall part 341 curved so as to be protruded toward first member 2, and peripheral wall part 342 connected to the outer peripheral end of center wall part 341 to surround center wall part 341. Peripheral wall part 342 is inclined toward first member 2 as being outward from center wall part 341 in the radial direction (radial direction of center wall part 341 when viewed in a plan view). That is, peripheral wall part 342 is formed in such a shape as to be gradually expanded toward inflow part 221. Peripheral wall part 342 is connected to the inner rim of the lower end of first guide channel 23 by the close contact between first member 2 and second member 3.

In addition, one portion 3431 in the circumferential direction (see FIG. 15), out of connection part 343 between center wall part 341 and peripheral wall part 342, is disposed at a position near inner bottom surface 3321 so as to face inner bottom surface 3321 from above in FIG. 15. For example, diaphragm part 34 is disposed such that the surface of portion 3431 is a plane orthogonal to a direction in which diaphragm part 34 is deformed (longitudinal direction of first guide channel 23).

Portion (hereinafter, referred to as "channel width-regulating portion" or "fourth portion") 3431 is a part of connection part 343, and regulates the width of the channel of second section 332.

It is noted that portions near connection part 343 at each of center wall part 341 and peripheral wall part 342 (end edge portion of center wall part 341 and end edge portion of peripheral wall part 342) are desirably formed to be thinner, compared with connection part 343 and portions other than the portion near connection part 343 at center wall part 341. For example, each of center wall part 341 and peripheral wall part 342 is desirably formed so as to have a thickness being gradually decreased toward connection part 343.

As illustrated in FIG. 6, first section 331 is disposed at a position near the radially outer side of diaphragm part 34.

Figure 16A:
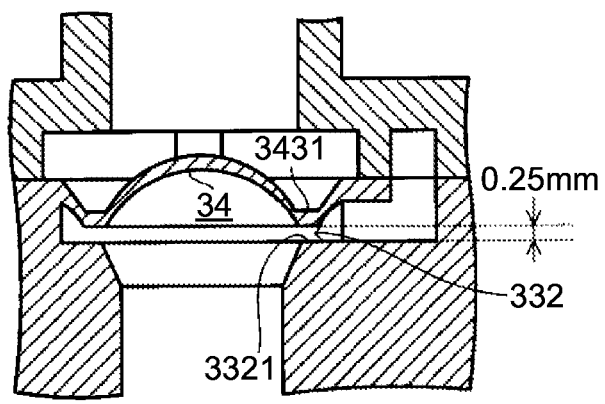
FIG. 16A is an enlarged sectional view of the diaphragm part and its periphery before the inflow of the irrigation liquid into the dripper.
Figure 16B:
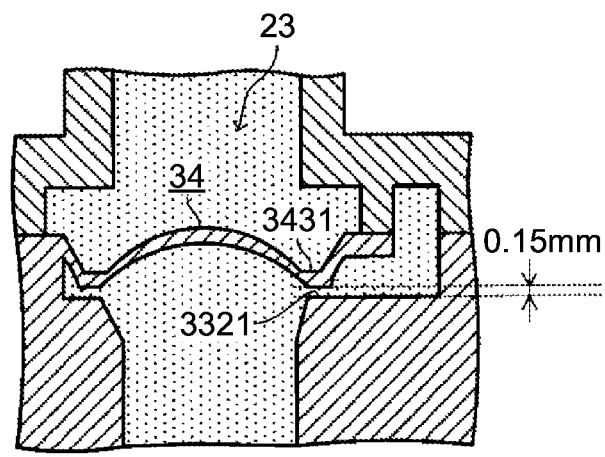
FIG. 16B is an enlarged sectional view of the diaphragm part and its periphery having been deformed upon receiving the liquid pressure of the irrigation liquid having flowed into the dripper.
Figure 16C:
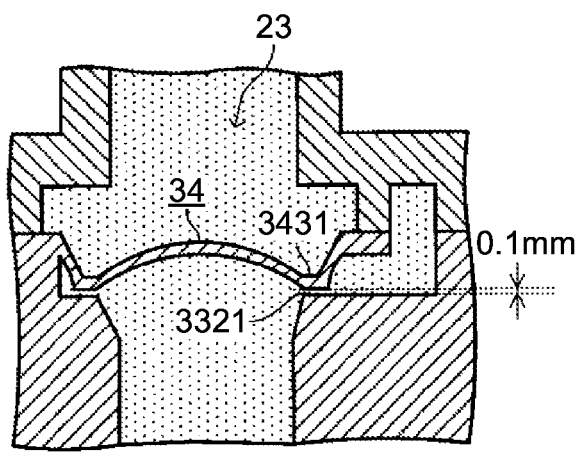
FIG. 16C is an enlarged sectional view of the diaphragm part and its periphery having been further deformed upon receiving the liquid pressure of the irrigation liquid having flowed into the dripper.

Here, FIGS. 16A, 16B and 16C illustrate specific examples of the operation of diaphragm part 34.

First, as illustrated in FIG. 16A, when the liquid pressure is 0 MPa, i.e., there is no irrigation liquid in first guide channel 23, the width regulation of second section 332 by diaphragm part 34 is not performed as a matter of course. That channel width in this case is 0.25 mm. It is noted that, as illustrated in FIG. 16A, the channel width is the shortest distance between fourth portion 3431 of diaphragm part 34 and inner bottom surface 3321.

Next, as illustrated in FIG. 16B, when the liquid pressure is equal to or more than 0.005 MPa (the above-mentioned fracture hydraulic pressure) and less than 0.05 MPa, diaphragm part 34 is deformed by the liquid pressure of the irrigation liquid in first guide channel 23. Therefore, fourth portion 3431 moves toward (downward) inner bottom surface 3321. Thus, the channel width is regulated to 0.15 mm.

Next, as illustrated in FIG. 16C, when the liquid pressure is equal to or more than 0.05 MPa and equal to or less than 0.1 MPa, diaphragm part 34 is deformed further compared with the state illustrated in FIG. 16B. Therefore, fourth portion 3431 moves further toward inner bottom surface 3321. Thus, the channel width is regulated to 0.1 mm.

[Operation and Effect of Present Embodiment].

According to the present embodiment, the irrigation liquid in tube 5 having reached the predetermined pressure flows into dripper 1 through inflow port 2212 of inflow part 221.

According to the present embodiment, the lower limit of the liquid pressure of the irrigation liquid flowing into pressure reduction channel part 8 can be controlled to be lower than the conventional case (i.e., the case of shielding the pressure reduction channel using the elasticity of the diaphragm) using hydrophobicity of inflow part 221. Therefore, even when the liquid pressure of the irrigation liquid outside of dripper 1 is low, that irrigation liquid can be properly used for drip irrigation.

In addition, at least surface 22111 outside of substrate part 2211 in inflow part 221 is formed so as to have hydrophobicity, thereby allowing a portion exposed to the external liquid pressure in inflow part 221 to have hydrophobicity. Therefore, the inflow of the irrigation liquid into the channel of dripper 1 can be properly controlled.

Further, when hydrophobicity is imparted to inner peripheral surface 22121 of inflow port 2212, capillary action in inflow port 2212 can be surely suppressed, making it possible to control the inflow of the irrigation liquid more properly.

Furthermore, when inflow part 221 is formed of a hydrophobic material, the hydrophobicity of inflow part 221 can be achieved with a smaller number of components.

In addition, when the hydrophobicity of inflow part 221 is achieved by hydrophobic coating, the hydrophobicity of inflow part 221 does not depend on the material of inflow part 221, and thus it is possible to further enhance the freedom in selecting the material of inflow part 221.

Further, when an irregular shape is formed on the hydrophobic surface of inflow part 221, the lower limit of the liquid pressure of the irrigation liquid flowing into the channel of dripper 1 can be adjusted to be somewhat higher. Therefore, it is possible to enhance the freedom in selecting the pressure of the inflow liquid during the use of dripper 1 under low pressure.

Furthermore, diaphragm part 34 provided in dripper 1 makes it possible to properly control the ejection amount of the irrigation liquid even when used under high pressure.

The irrigation liquid having flowed into dripper 1 reaches the terminal, where diaphragm part 34 is disposed, of first guide channel 23 through first guide channel 23.

The irrigation liquid having reached the terminal of first guide channel 23 deforms diaphragm part 34 with its liquid pressure, while being inhibited from moving forward in such a manner as to be dammed by diaphragm part 34, and as a result is led to pressure reduction channel 8 sideward as an escape.

The irrigation liquid introduced into pressure reduction channel 8 undergoes pressure reduction due to pressure loss caused by the shape of the channel of pressure reduction channel 8.

The irrigation liquid of which pressure is reduced by pressure reduction channel 8 flows into first section 331 in second guide channel 33 connected to terminal 8E of pressure reduction channel 8, and then passes through second section 332.

At that time, diaphragm part 34 is deformed by the liquid pressure of the irrigation liquid with which first guide channel 23 is filled, such that fourth portion 3431 moves toward inner bottom surface 3321. Therefore, the width of the channel of second section 332 is decreased by an amount according to the amount of this deformation.

Accordingly, the flow rate of the irrigation liquid passing through second section 332 (flow rate moving toward third section 333 and ejection port 321 all at once) is regulated by the influence of the regulation on the channel width by diaphragm part 34.

Here, two cases will be discussed in which the liquid pressure of the irrigation liquid flowing into dripper 1 is relatively high and is relatively low. The examples of the causes for such two cases include a position at which dripper 1 is attached on tube 5 (whether near to or distant from a pump), performance of the pump itself (whether high-pressure pump or low-pressure pump), and change of the performance of the pump itself over time.

First, when the pressure of the irrigation liquid is high, the inflow amount of the irrigation liquid into the channel of dripper 1 becomes relatively larger, but at the same time the amount of deformation of diaphragm part 34 becomes relatively larger. Thus, the flow rate of the irrigation liquid to be regulated by diaphragm part 34 also becomes relatively larger. Therefore, the ejection amount of the irrigation liquid from ejection port 321 does not become excessively large.

On the other hand, when the pressure of the irrigation liquid is low, the inflow amount of the irrigation liquid into the channel of dripper 1 becomes relatively smaller, but at the same time the amount of deformation of diaphragm part 34 becomes relatively smaller. Thus, the flow rate of the irrigation liquid to be regulated by diaphragm part 34 also becomes relatively smaller. Therefore, the ejection amount of the irrigation liquid from ejection port 321 does not become excessively small.

Thus, the ejection amount of the irrigation liquid from ejection port 321 can be suitably controlled so as to have less variation (such that the variation of that ejection amount is regulated to 5 to 10%, for example), irrespective of the liquid pressure of the irrigation liquid at the time of flowing into dripper 1.

In addition, diaphragm part 34 has a structure in which pressure reduction channel 8 is not shielded, unlike the techniques set forth in PTLS 1 and 2, and pressure reduction channel 8 is constantly opened. Therefore, in the present embodiment, the inflow of the irrigation liquid into pressure reduction channel 8 is not regulated. Therefore, the presence of diaphragm part 34 does not constitute a cause for raising the lower limit of the liquid pressure of the irrigation liquid available for drip irrigation toward the high pressure side.

In addition, diaphragm part 34 is integrally molded with the same resin material as that of second member 3. Therefore, in the present embodiment, such dripper 1 excellent in controlling the ejection amount of the irrigation liquid can be manufactured at a low cost and with less processes with only two components of first member 2 and second member 3 made of a resin material. In particular, there are quite large advantages in terms of costs and manufacturing efficiency when compared with the case of assembling a diaphragm made of an expensive material such as silicone rubber as an individual component.

In addition, since diaphragm part 34 is assembled into second member 3 as an integrally molded product, malfunction of diaphragm part 34 due to assembly error is less likely to occur, contributing to the stabilization of the ejection amount of the irrigation liquid.

Further, diaphragm part 34 is capable of regulating the channel width properly and efficiently by utilizing the pressure difference between the irrigation liquid in pressure reduction channel 8 after pressure reduction by pressure reduction channel 8 and the irrigation liquid in first guide channel 23 to which diaphragm part 34 is exposed. That is, the reduced liquid pressure of the irrigation liquid in second section 332 is sufficiently low. Therefore, that liquid pressure does not hinder the deformation operation of diaphragm part 34 by the irrigation liquid in first guide channel 23 having a relatively high pressure.

Furthermore, first section 331 of second guide channel 33 is disposed near diaphragm part 34. Therefore, compared with the case where first section 331 is disposed away from diaphragm part 34, the shape of a metal mold in which second member 3 is molded with resin can be simplified, and thus the manufacturing cost can be further reduced.

In addition, diaphragm part 34 is deflected so as to cancel the curvature toward first guide channel 23 utilizing the elasticity of the resin material to expand outwardly in the radial direction upon receiving the liquid pressure at center wall part 341 from first guide channel 23 side. At the same time, peripheral wall part 342 is rotated about a contact point where peripheral wall part 342 intersects with second plate-like part 31 as a rotation axis. Therefore, fourth portion 3431 can be smoothly displaced toward inner bottom surface 3321 of second section 332.

Thus, diaphragm part 34 is formed into a suitable shape to be deformed toward inner bottom surface 3321 upon efficiently receiving the liquid pressure of the irrigation liquid in first guide channel 23. Accordingly, the channel width can be regulated more properly. Such an effect can be further enhanced by forming a portion near fourth portion 3431 in diaphragm part 34 to be thinner. It is noted that the channel width may be regulated more stably by forming fourth portion 3431 to be further thicker.

As has been described above, according to the present embodiment, the dripper includes at least a pipe for penetrating the tube wall of the tube through which the irrigation liquid is supplied, a flange part extending outwardly from the outer periphery of that pipe, a partition wall that closes the inside of that pipe in that flange part, and a bypass channel that is formed inside the flange part and allows communication between two portions, of the pipe, partitioned by the partition wall, and that bypass channel includes a pressure reduction channel for reducing the pressure of the irrigation liquid flowing through the bypass channel. In addition, the dripper is composed of the above-mentioned first member and second member that divide the pipe part and flange part into two portions, and the partition wall is integrally formed with either of first member or second member.

In addition, when at least the partition wall is a diaphragm part that moves in such a direction so as to close the inside of the pipe or the bypass channel upon receiving the pressure of the irrigation liquid having flowed into the pipe, it is possible to provide a dripper enabling the ejection amount of the irrigation liquid to be stabilized, and cost reduction to be achieved by reducing the manufacturing cost, number of components and manufacturing processes, and a drip irrigation apparatus including the dripper. In this case, the above-mentioned low pressure stop filter function does not need to be provided at the inflow port disposed at the end of the pipe disposed in the tube. However, the dripper further including the above-mentioned low pressure stop filter function is more effective from the viewpoint of stabilizing the drop of the irrigation liquid when the liquid pressure of the irrigation liquid is low.

In addition, when at least the inflow port has the low pressure stop filter function, it is possible to provide a dripper enabling drip irrigation to be properly performed even when the liquid pressure of the irrigation liquid is low, and a drip irrigation apparatus including the dripper. In this case, the partition wall does not need to have the above-mentioned function of the diaphragm part. However, the partition wall being the diaphragm part is more effective from the viewpoint of stabilizing the drop of the irrigation liquid when the liquid pressure of the irrigation liquid fluctuates higher.

It is noted that the present invention is not limited to the above-described embodiment, and the above-described embodiment may be modified in various manners as long as the feature of the present invention is provided.

[Modification].

Figure 17:
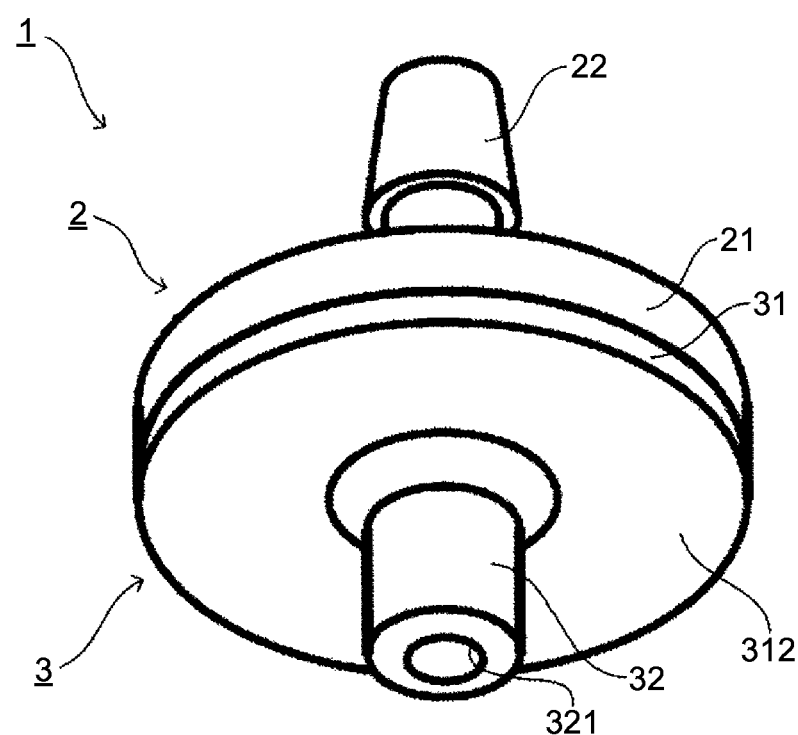
FIG. 17 is a perspective upward view illustrating a first modification of the dripper according to the present invention.

As illustrated in FIG. 17, the dimension of second protrusion part 32 in the protrusion direction may be shorter, for example.

Figure 18:
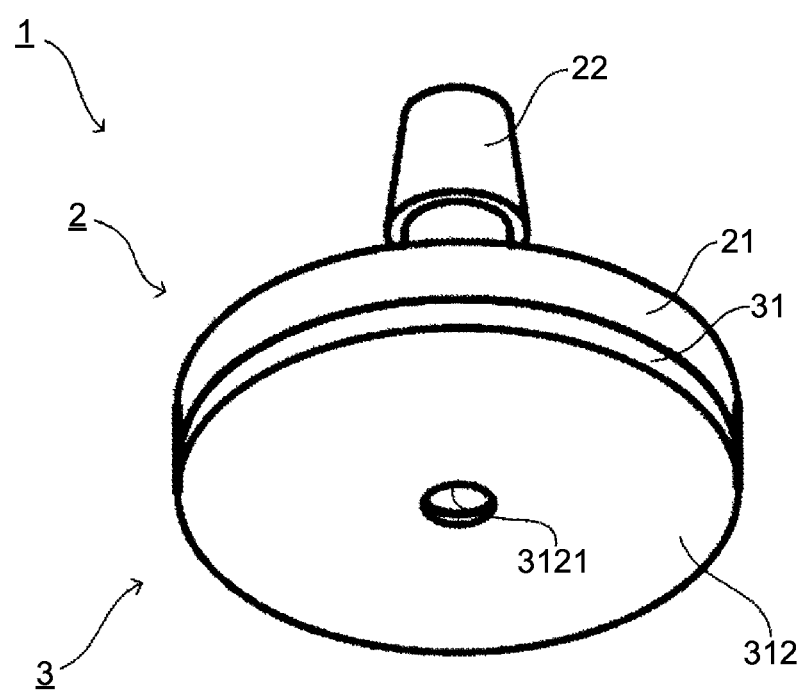
FIG. 18 is a perspective upward view illustrating a second modification of the dripper according to the present invention.

Alternatively, as illustrated in FIG. 18, second protrusion part 32 itself does not need to be provided. In this case, ejection port 3121 can be formed on second outer surface 312.

Figure 19:
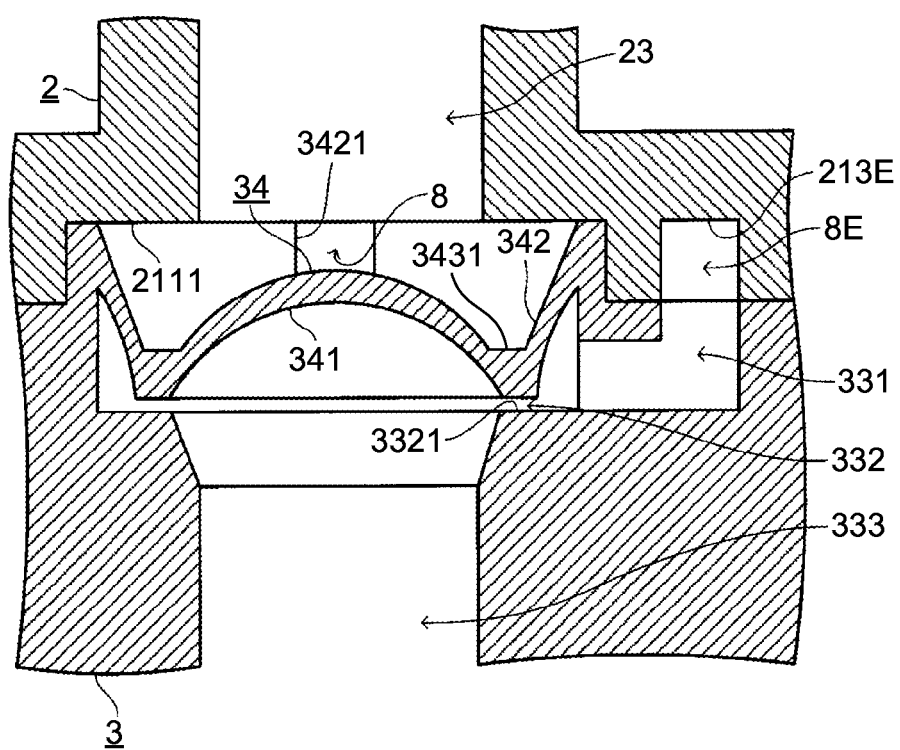
FIG. 19 is an enlarged sectional view of a diaphragm part and its periphery in a third modification of the dripper according to the present invention.

Alternatively, as illustrated in FIG. 19, the end portion (upper end portion in FIG. 19) of diaphragm part 34 on first member 2 side may be extended to such a position as to abut recess 2111. In this case, opening 3421 for allowing the inflow of the irrigation liquid into pressure reduction channel 8 can be formed on peripheral wall part 342 of diaphragm part 34.

The disclosures of Japanese Patent Applications No. 2012-196149 filed on Sep. 6, 2012, and No. 2012-216574 filed on Sep. 28, 2012 including the specification, drawings and abstract are incorporated herein by reference in their entirety.

Industrial Applicability

The dripper according to the present invention is capable of dropping a stable amount of irrigation liquid without depending on the liquid pressure of the irrigation liquid. In addition, such dripper can be formed by the joining of two injection-molded products. Therefore, it is possible to manufacture the dripper at a low cost and in a large amount. Accordingly, it is expected that the dripper and drip irrigation apparatus according to the present invention are utilized not only in drip irrigation but also in various industries where stable dropwise addition of liquid is demanded.

REFERENCE SIGNS LIST

1 Dripper
2 First member
21 First plate-like part
211 First inner surface
212 First outer surface
213 Pressure reduction channel part
22 First protrusion part
221 Inflow part
23 First guide channel
3 Second member
31 Second plate-like part
311 Second inner surface
312 Second outer surface
321 Ejection port
33 Second guide channel
34 Diaphragm part
8 Pressure reduction channel
11 Plate-like body

The invention claimed is:

1. A drip irrigation dripper for controlling an ejection amount of irrigation liquid, having flowed from an inflow part, from an ejection port to eject the irrigation liquid, the drip irrigation dripper comprising:
    a first member integrally formed of a resin material and composing one part on the inflow part side of the drip irrigation dripper; and
    a second member integrally formed of a resin material and composing the other part on the ejection port side of the drip irrigation dripper, the second member being fixed to the first member,
wherein:
the first member includes:
    a first plate-like part having a first inner surface to be brought into close contact with the second member and a first outer surface at a side opposite to the first inner surface,
    a first protrusion part being protruded from the first outer surface toward a side opposite to the second member and having the inflow part at a tip portion of the first protrusion part,
    a first guide channel formed from the inflow part to the first inner surface and guiding the irrigation liquid having flowed from the inflow part toward the first inner surface, and
    a pressure reduction channel part for forming, between the first inner surface and the second member, a pressure reduction channel connected continuously to a terminal of an inner surface of the first guide channel and allowing the irrigation liquid having been guided by the first guide channel to flow toward the ejection port while reducing a pressure of the irrigation liquid; and
the second member includes:
    a second plate-like part having a second inner surface to be brought into close contact with the first inner surface and forming the pressure reduction channel together with the pressure reduction channel part and a second outer surface at a side opposite to the second inner surface,
    a second guide channel formed from a terminal position of the pressure reduction channel at the second inner surface to the ejection port and for guiding the irrigation liquid of which pressure is reduced by the pressure reduction channel to the ejection port, and a diaphragm part formed at a terminal of the first guide channel to form a part of an inner surface of the second guide channel and being to be deformed toward the second guide channel upon receiving a liquid pressure of the irrigation liquid having been guided by the first guide channel to regulate a width of the second guide channel to be smaller as the liquid pressure is increased.

2. The drip irrigation dripper according to claim 1, wherein the diaphragm part includes:
   a dome-shaped center wall part curved to be protruded toward the first member;
   a peripheral wall part connected to an outer peripheral end of the center wall part to surround the center wall part and being inclined toward the first member as being outward from the center wall part in a radial direction of the center wall part when viewed in a plan view; and wherein
   a connection part, between the center wall part and the peripheral wall part, is configured to regulate the width of the second guide channel.

3. The drip irrigation dripper according to claim 2, wherein an end edge portion on the connection part side of each of the center wall part and the peripheral wall part has a thinner wall thickness than the connection part and portions other than the end edge portion of the center wall part.

4. The drip irrigation dripper according to claim 1, wherein a starting end of the second guide channel is disposed in the vicinity of the diaphragm part.

5. The drip irrigation dripper according to claim 1, wherein the ejection port opens to the second outer surface.

6. The drip irrigation dripper according to claim 1, wherein the ejection port is formed at a tip portion of a second protrusion part protruded from the second outer surface toward a side opposite to the first member.

7. A drip irrigation apparatus comprising:
   the drip irrigation dripper according to claim 1; and
   a flow tube through which the irrigation liquid flows, wherein:
   when the first protrusion part of the drip irrigation dripper is inserted into a tube wall or an opening of the flow tube, the irrigation liquid in the flows tube to flow into a channel of the drip irrigation dripper from the inflow part.

8. A drip irrigation dripper for controlling an ejection amount of irrigation liquid, having flowed from an inflow part, from an ejection port to eject the irrigation liquid, the drip irrigation dripper comprising:
   a plate-like body having a first outer surface on the inflow part side of the drip irrigation dripper and a second outer surface on the ejection port side at a side opposite to the first outer surface;
   a first protrusion part being protruded from the first outer surface toward a side opposite to the second outer surface and having the inflow part at a tip portion of the first protrusion part;
   a first guide channel formed from the inflow part into the plate-like body and guiding the irrigation liquid having flowed from the inflow part into the plate-like body;
   a pressure reduction channel formed to be connected to a terminal of the first guide channel to allow the irrigation liquid having been guided by the first guide channel to flow toward the ejection port while reducing a pressure of the irrigation liquid; and
   a second guide channel formed from a position connected to a terminal of the pressure reduction channel inside the plate-like body to the ejection port disposed on the second outer surface side of the drip irrigation dripper and for guiding the irrigation liquid of which pressure is reduced by the pressure reduction channel to the ejection port, wherein:
   the inflow part has hydrophobicity and prevents the irrigation liquid having a liquid pressure less than a predetermined liquid pressure from flowing into the inflow part.

9. The drip irrigation dripper according to claim 8, wherein:
   the inflow part includes a substrate part that partially shields a starting end of the first guide channel,
   the substrate part includes a plurality of inflow ports extending through the substrate part, and
   at least a surface on a side, of the substrate part, opposite to the first guide channel has hydrophobicity.

10. The drip irrigation dripper according to claim 9, wherein an inner peripheral surface of each of the inflow ports also has hydrophobicity.

11. The drip irrigation dripper according to claim 9, wherein the inflow part comprises a hydrophobic material having hydrophobicity.

12. The drip irrigation dripper according to claim 9, wherein the inflow part includes hydrophobic coating having hydrophobicity.

13. The drip irrigation dripper according to claim 11, wherein the inflow part has, on a hydrophobic surface, an irregular shape that reinforces the hydrophobicity.

14. The drip irrigation dripper according to claim 8, further comprising:
   a diaphragm part formed at the terminal of the first guide channel to form a part of an inner surface of the second guide channel and being to be deformed toward the second guide channel upon receiving the liquid pressure of the irrigation liquid having been guided by the first guide channel, the diaphragm part being for regulating a width of the second guide channel to be smaller as the liquid pressure is increased.

15. The drip irrigation dripper according to claim 14, comprising:
   a first member integrally formed of a resin material and composing one part on the inflow part side of the drip irrigation dripper; and
   a second member integrally formed of a resin material and composing the other part on the ejection port side of the drip irrigation dripper, the first member being fixed to the second member,
   wherein:
   the first member includes:
   a first plate-like part having a first inner surface to be brought into close contact with the second member and the first outer surface at a side opposite to the first inner surface,
   the first protrusion part,
   the first guide channel disposed from the inflow part to the first inner surface;
   a pressure reduction channel part for forming, between the first inner surface and the second member, the pressure reduction channel connected continuously to a terminal of an inner surface of the first guide channel;
   the second member includes:
   a second plate-like part having a second inner surface that is to be brought into close contact with the first inner surface and that forms the pressure reduction channel together with the pressure reduction channel part, and the second outer surface at a side opposite to the second inner surface, the second guide channel disposed from a terminal of the pressure reduction channel part at the second inner surface to the ejection port, and the diaphragm part.

16. A drip irrigation apparatus comprising:

the drip irrigation dripper according to claim 8; and a flow tube through which the irrigation liquid flows, wherein:

when the first protrusion part of the drip irrigation dripper is inserted into a tube wall or an opening of the flow tube, the irrigation liquid in the flows tube to flow into a channel of the drip irrigation dripper from the inflow part.

\* \* \* \* \*